Nov. 5, 1929.  W. M. CHESNUTT  1,734,326
CASTER WHEEL
Filed Nov. 2, 1927
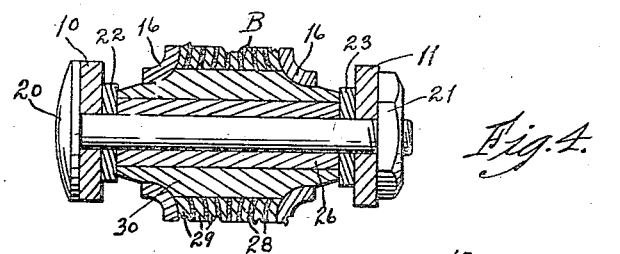
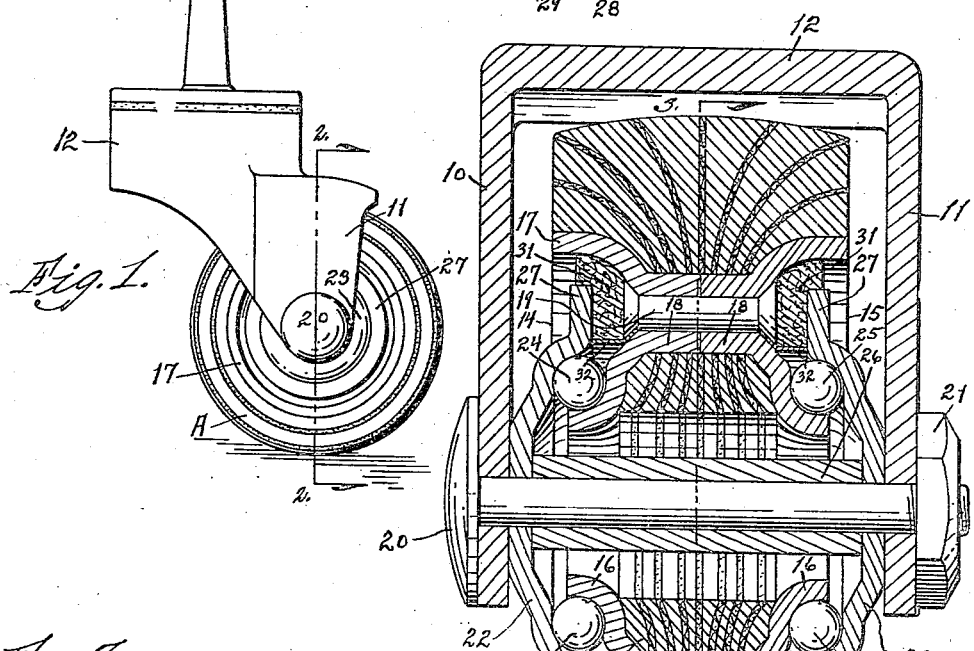
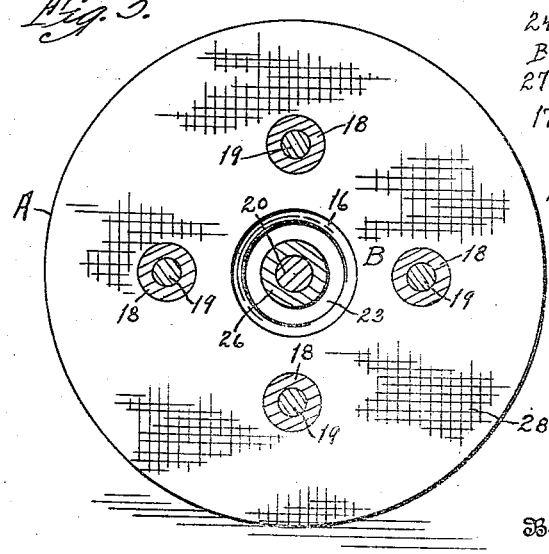
Inventor
WM. M. CHESNUTT
By Earl M. Sinclair
Attorney Patented Nov. 5, 1929

1,734,326

UNITED STATES PATENT OFFICE

WILLIAM MORTON CHESNUTT, OF FRESNO, CALIFORNIA, ASSIGNOR TO JOHN LOUCIEN CHESNUTT, OF LONG BEACH, CALIFORNIA, AND FISK MARK RAY, OF OAKLAND, CALIFORNIA

CASTER WHEEL

Application filed November 2, 1927. Serial No. 230,517.

The primary object of this invention is to provide an improved construction for a wheel especially adapted for use on casters designed for use on furniture, trucks, and the like.

A further object of the invention is to provide an improved construction for a tread of a caster wheel which is comparatively soft and resilient and consequently practically noiseless and producing a relatively small amount of wear on floors and floor coverings.

A still further object of the invention is to provide an improved means for mounting and securely holding a resilient tread on a caster wheel.

Another object of the invention is to provide an improved construction for the bearings of a caster wheel.

A further object of this invention is to provide improved means for lubricating and protecting the bearings of a caster wheel by inclosing them within a water-proof and dirt-proof and grease-retaining chamber.

With these and other objects in view, my invention consists in the construction, arrangement and combination of elements hereinafter set forth, pointed out in the claims and indicated by the accompanying drawing in which—

Fig. 1 is a side elevation of a caster equipped with a wheel embodying my improvements.

Fig. 2 is a vertical section through the wheel on the line 2—2 of Fig. 1.

Fig. 3 is a section through the wheel on the line 3—3 of Fig. 2.

Fig. 4 is a detail sectional view of a portion of a wheel of modified form and embodying plain bearings.

As here shown, the wheel is mounted for rotation between spaced wings 10 and 11 of a wheel yoke 12, which has suitable means for attaching it to a load object, in this instance such means being a stem 13. The construction of the caster and the swivel construction of the yoke and stem or other attaching means form no part of my present invention, but may be of any suitable construction, such for instance as is described in my companion application filed September 19, 1927, Serial Number 220,371.

In the construction of the wheel, two side plates 14 and 15 are employed which are alike in form and construction, but are oppositely arranged. Each side plate 14 and 15 is of annular shape and is formed at its inner periphery with an outwardly facing ball race 16. The outer marginal portion of each side plate is extended laterally outwardly to form a peripheral flange 17. Each side plate 14 and 15 is formed with a plurality of apertured bosses 18, in this instance four in number, and the bosses of said side plates contact with each other at the median line of the wheel and serve as spacing members. Securing members such as rivets 19 are extended through said bosses and hold the two side plates and other members together when the wheel is assembled. An axle member 20, in this instance in the form of a bolt with a removable nut 21, is carried by the wings 10 and 11 of the yoke and extends loosely through the central apertures of the side plates 14 and 15. Concavo-convex ball races 22 and 23 are mounted between the wings 10 and 11 and the respective side plates 14 and 15 and are arranged with their convex faces outwardly and in contact with the inner faces of said wings. The race members 22 and 23 extend inwardly in partially embracing relation to the ball races 16 of the side plates and bearing balls 24 and 25 are mounted in series between the race members 22 and 23 and the ball races 16 of the respective side plates. The race members 22 and 23 are formed with central apertures to receive the axle 20 on which they are rigidly supported and a spacing sleeve or bushing 26 is mounted on said axle between said race members and serves as a spacer therefor when the nut 21 is drawn up tight on the axle. The marginal portions of the concavo-convex race members 22 and 23 are extended outwardly to form flanges 27 which project toward the flanges 17 of the side plates and tend to prevent the entrance of dirt, string and other foreign substances to the ball races.

The tread of the wheel may be formed in any suitable fashion, but preferably is of laminated construction. For many uses to which casters are put, it is desirable to have a comparatively soft or flexible tread which will be relatively noiseless in use and will result in a minimum amount of wear on the floor or on a floor covering. To meet this need, I have provided a special form of tread which is composed of a plurality of annular sheets 28 of fabric or fabric impregnated with rubber. The sheets or disks 28 are spaced apart and the spaces between them are filled with a homogeneous substance 29 which may be of rubber or a composition of rubber and fabric. The sheets 28 preferably are arranged in a substantially vertical plane at the median line of the wheel, but those at both sides of the median line preferably flare or curve outwardly toward the tread and side walls of the tread portion of the wheel, as clearly shown in Fig. 2. The wheel tread formed of the disks 28 and intervening substance 29 is vulcanized to form a composite whole. This tread portion which I have designated generally by the letter A, is of generally annular form and fits upon the rim provided by the flanges 17 of the side plates and is also formed at its inner circumference with an integral extension B, which is arranged between the main portions of the side plates 14 and 15 and is clamped between them. The bosses 18 of the side plates and the rivets 19 also extend through the extension B and further serve to hold the tread member in place relative to the rim. It is obvious that by this arrangement I have provided a simple and economical means for holding the tread member on the wheel and preventing it from pulling out of the space between the side plates and off of the rim of the wheel by limiting or preventing the outward stretch of the rubber, while at the same time permitting the compression of the rubber or rubber and fabric between the floor and the rim while under load. The tread member may be placed in a mold for vulcanizing to the desired degree of toughness and hardness without materially impairing its resiliency and if desired, the metal side plates may be placed within the mold during the vulcanizing operation or they may be assembled to the tread later.

If desired, the bearing balls 24 and 25 may constitute the entire bearing means between the stationary and the rotatable parts of the wheel and may be employed to counteract side strains as well as to carry the weight of the load. At times however, it may be considered desirable to employ additional bearings for the wheel, especially when the caster is to be used for heavy duty. For this purpose I have shown a bearing member 30 interposed between the bushing 26 and the inner marginal edges of the side plates 14 and 15. This construction is shown in Fig. 4 and I wish it to be understood that any suitable type of bearings may be employed without departing from my invention. It is also obvious that various combinations of the bearings may be employed in different wheels, particularly where different kinds of service are required, but by employing the construction I have shown and described, it is possible to adapt a line of casters to various qualities of usefulness without any great changes and without carrying a large stock of different parts for the device. This adaptability extends also to the tread, as a large variety of treads composed of various materials for a wide and varied field of service may be employed with the same side plates and other members. This reduces the cost of manufacture and assembly and the cost of the manufactured product necessary to carry in stock. Particular attention is called to the shape and arrangement of the side plates 14 and 15 and the concavo-convex race members 22 and 23, which are readily adaptable to the mounting and use of several kinds of bearings and combination of bearings and which make it possible to form the space for the enlargement or extension B of the tread member within the space available especially in wheels of small diameter and narrow width. The ball race members 22 and 23 serve as combination ball races and string guards although constructed each of a single piece of sheet metal. These parts also serve to retain lubricating grease which may be inserted between the parts and the balls 24 and 25 and the other bearings.

A washer 31 of the felt or other suitable material is mounted on a thin metal ring 32 and extended outwardly to contact with the inner surface of the overhanging flanges 17 as the wheel revolves. This is designed to assist in excluding water, dirt, and other foreign substances and also to retain grease within the parts so as to facilitate and improve the lubrication and increase the efficiency and prolong the service of the wheel. The ring 32 may be held in place by engagement of the securing members 19 or the like as shown in Fig. 2 and serve to support the washers 31 in the desired position. The latter members preferably are turned outwardly at their outer peripheries so as to overhang the peripheries of the ball race members 22 and 23 respectively.

I claim as my invention:

1. A wheel for casters and the like comprising a pair of spaced side plates each formed with a plurality of inwardly extending apertured bosses, a laminated tread member mounted between said side plates, the several units of said tread member being formed with spaced registering holes through which said bosses extend, and securing members projecting through the bosses and binding the units of the tread member together and between said side plates.

2. A wheel for casters and the like comprising a pair of spaced side plates each formed with a plurality of inwardly extending apertured bosses, the bosses of the respective side plates contacting at their inner ends, a tread member mounted between said side plates and through which said bosses extend, and securing members projecting through the bosses and binding the tread member between said side plates.

3. A wheel for casters and the like comprising a pair of spaced side plates each having an outwardly extending peripheral flange at its outer margin, a tread member formed of rubber composition mounted on the flanges of said side plates and having a portion extending between said side plates and formed with spaced holes, said side plates being formed with bosses extending within the holes of said tread member, into engagement with each other, and securing means extending through said side plates and bosses for securely gripping that portion of the tread member extending between said side plates.

4. A wheel for casters and the like comprising a pair of spaced side plates each having an outwardly extending peripheral flange at its outer margin and an outwardly facing ball race at its inner margin, a tread member formed of rubber composition mounted on the flanges of said side plates and having a portion extending between said side plates, securing means extending through said side plates and through that portion of the tread member extending between them, concavo-convex race members mounted outside of the side plates and having races cooperating with the races thereof, and balls mounted in the respective cooperating ball races.

5. A wheel for casters and the like comprising a pair of spaced side plates each having an outwardly extending peripheral flange at its outer margin and an outwardly facing ball race at its inner margin, a tread member formed of rubber composition mounted on the flanges of said side plates and having a portion extending between said side plates, securing means extending through said side plates and through that portion of the tread member extending between them, concavo-convex race members mounted outside of the side plates and having races cooperating with the races thereof, and bearing balls mounted in the respective cooperating ball races, said race members having peripheral flanges extending toward the outwardly extending peripheral flanges of the side plates.

6. A device of the class described, comprising a pair of spaced wings, a pair of ball race members mounted between said wings, a bushing occupying the space between said ball race members, an axle passing through said wings, ball race members, and bushing, and a wheel including spaced side plates having a rim portion and also having outwardly facing ball races, bearing balls mounted in the respective ball races and contacting with said ball race members, and a tread member carried by said side plates.

7. A device of the class described, comprising a pair of spaced wings, a pair of ball race members mounted between said wings, a bushing occupying the space between said ball race members, an axle passing through said wings, ball race members, and bushing, and a wheel including spaced side plates having a rim portion and also having outwardly facing ball races, bearing balls mounted in the respective ball races and contacting with said ball race members, a tread member carried by said side plates, and a bearing member interposed between said bushing and the side plates of said wheel.

8. A caster wheel comprising an axle, an annular rotatable member thereon, bearings between said rotatable member and the axle, a pair of concavo-convex members on opposite sides of said rotatable member serving to inclose the central space thereof to form a chamber for the bearings, and resilient washers carried by said rotatable member and projecting toward said concavo-convex members to exclude foreign substances from said chamber and also to retain a lubricant therein.

WILLIAM MORTON CHESNUTT.